UNITED STATES PATENT OFFICE 2,265,432

MANUFACTURE OF DYESTUFF INTERMEDIATES

Arnold Kershaw and Kenneth Herbert Saunders, Manchester, England, assignors to Imperial Chemical Industries Limited, a corporation of Great Britain No Drawing. Application September 21, 1939, Serial No. 295,912. In Great Britain September 22, 1938

5 Claims. (Cl. 260—295)

The present invention relates to the manufacture of new arylamides of o-hydroxyarylcarboxylic acids and of insoluble azo dyestuffs therefrom.

This invention has as an object to provide new arylamides of o-hydroxyarylcarboxylic acids and insoluble azo dyestuffs therefrom. Other objects will appear hereinafter. These objects are accomplished by the following invention.

We have found that we can cause to interact aminoarylpyridines with o-hydroxyaryl carboxylic acids, or with reactive derivatives of such acids, in such a way that arylamides of the said o-hydroxyaryl carboxylic acids are produced, capable of coupling with diazonium compounds in a position ortho to the hydroxy group.

Suitable o-hydroxyaryl carboxylic acids for use in the above manner include 2:3-hydroxynaphthoic acid, 6-bromo- and 6-methoxy:2:3-hydroxynaphthoic acids, 2:3-hydroxycarbazole carboxylic acid, 2s3-hydroxy diphenylene oxide carboxylic acid and 2:3-hydroxyanthracene carboxylic acid.

The new arylamides are eminently suitable for colouring cellulosic fibre by coupling them thereon with diazonium compounds. These arylamides are convenient to dissolve and possess an outstandingly high affinity for cellulosic fibre when applied thereto from aqueous caustic alkali solution and there may be produced on such fibre by their aid azoic colours of good rubbing fastness and excellent general fastness properties.

A further feature of the invention comprises the coupling on cellulosic fibre of arylamides of o-hydroxyaryl carboxylic acids as above defined, with diazonium compounds, which may be applied in the form of stable derivatives, so that insoluble azo dyestuffs are formed on the fibre with development of colour.

The diazonium compounds employed may be derived from aromatic amines commonly used for making azoic colours such as, for example, o- or m-chloraniline, 4-chloro-2-aminoanisole and 4-nitro-2-aminoanisole.

The invention is illustrated but not limited by the following examples in which the parts are by weight.

Example 1

10 parts of 4-amino-α-phenylpyridine mixed with the correspondingly β and γ compounds, the mixture being made as described below, are dissolved in 175 parts of toluene, 11.0 parts of 2:3-hydroxynaphthoic acid are added and the solution is stirred and heated to boiling under a reflux condenser. 3.0 parts of phosphorus trichloride are added during 1 hour. The mixture is boiled for a further 15 hours, cooled and poured into 100 parts of 10% aqueous solution of sodium carbonate. The toluene is driven off by distillation in steam. The substance remaining undissolved in the aqueous sodium carbonate is then filtered off and dissolved in a sufficiency of aqueous sodium hydroxide solution. After filtration of the solution when necessary, the new compound is precipitated by the addition of acid, filtered off, washed with water and dried. The product is believed to be N-(2'-hydroxy-3'-naphthoyl)-4-alpha-pyridylaniline mixed with the corresponding β and γ compounds and has a high affinity for cellulosic fibre. The product is represented by the formula

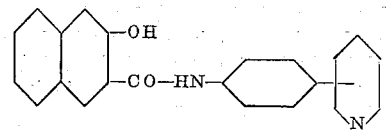

The mixture of 4-amino and the corresponding β and γ compounds used above is represented by the formula

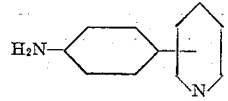

and may be made by reacting pyridine with diazotized 1-amino-4-nitro-benzene, allowing the reaction to proceed at a relatively low temperature in an excess of the pyridine, isolating the nitro-phenyl-pyridines, and reducing the nitro group of the mixture of isomeric 4-nitro-phenyl-pyridines so obtained. As starting compound alpha-, beta-, or gamma-picoline can be used instead of pyridine.

Example 2

3 parts of the new amide mixture obtained according to Example 1 are made into a paste with 10 parts of Turkey red oil neutralised with caustic soda and containing 50% of water, and 60 parts of boiling water are added, followed by 6 parts of aqueous sodium hydroxide liquor of sp. gr. 1.30. The solution is made up to 1,000 parts by adding 921 parts of cold water containing 10 parts of sodium chloride. 50 parts of cotton yarn are soaked for 20 minutes in this solution, squeezed well and immersed in 1,000 parts of a solution containing 2 parts of diazotised 5-nitro-2-amino-anisole. The cotton is turned for 20 minutes, squeezed, rinsed with cold water and then boiled in a solution containing 2 parts of sodium carbonate and 3 parts of soap per 1,000 parts. A bluish-red shade is obtained having good fastness to chlorine, kier boiling, boiling sodium carbonate solution and light.

The following table affords a list of further combinations together with the shades produced which are obtained by replacing the diazotised 5-nitro-2-amino-anisole in the above example by other diazonium compounds.

| Diazonium compound of— | Shade produced |
|---|---|
| o-Chloraniline | Scarlet. |
| m-Chloraniline | Do. |
| 4-chloro-2-amino-anisole | Bluish-red. |
| 5-chloro-2-aminotoluene | Red. |
| 2:5-dichloraniline | Scarlet. |
| 4-benzoylamino-2:5-diethoxyaniline | Blue. |
| 4-nitro-2-amino-anisole | Red. |

Example 3

8.5 parts of isomeric aminophenylpyridines, made as described in Example 1, are dissolved in 175 parts of toluene and 11.0 parts of 2-hydroxy carbazole-3-carboxylic acid added. 2.7 parts of phosphorus trichloride are dropped in during 1 hour with stirring at 60–65° C. and the mixture then boiled for 15 hours. The product is isolated as described in Example 1. When applied to cellulosic fibres and developed with diazonium compounds in the way described in Example 2 brown shades of excellent fastness properties are obtained.

Example 4

9.3 parts of isomeric 4-amino-3-methyl phenyl-pyridines, made as described below, are condensed in 200 parts of toluene with 9.5 parts of 2:3-hydroxynaphthoic acid by the aid of 2.7 parts of phosphorus trichloride which is added at 60–65° C. during 1 hour and the mixture then boiled for 15 hours. The product is isolated as described in Example 1. It has a similar affinity for cellulosic fibres to the product of Example 1 and when applied to cellulosic fibre and developed according to Example 2 affords similar fast shades.

The isomeric 4-amino-3-methyl phenylpyridines are made by diazotising 1-amino-4-acetamino-3-methylbenzene, reacting with pyridine to form 4-acetylamino-3-methyl-phenylpyridines and deacetylating the product.

Example 5

9.2 parts of isomeric 4-aminophenyl-α-picolines are dissolved in 175 parts of toluene, 9.5 parts of 2:3-hydroxynaphthoic acid added and condensation carried out at 60–65° C. by adding 2.7 parts of phosphorus trichloride during 1 hour and boiling for 15 hours. The product is isolated according to Example 1. It possesses similar properties to the product of Example 1.

Example 6

10.8 parts of isomeric 2-nitro-4-aminophenyl-pyridines made as described below are dissolved in 200 parts of toluene together with 10 parts of 2:3-hydroxynaphthoic acid and condensation effected and the product isolated as in Example 5. The product is similar in its properties to that of Example 1.

The isomeric nitro-4-aminophenylpyridines are made by nitrating in strong sulphuric acid with one equivalent of mixed nitric-sulphuric acid the isomeric 4-aminophenylpyridines.

Example 7

10 parts of isomeric 2-methoxy aminophenyl-pyridines made as described below are condensed in 250 parts of toluene together with 9.6 parts of 2:3-hydroxynaphthoic acid and condensation effected and the product isolated as in Example 5. The product is similar in its properties to that of Example 1.

The isomeric 2-methoxy aminophenylpyridines are made by reacting pyridine with diazotised o-anisidine, mono-nitrating the product and reducing the nitro group.

Example 8

12 parts of 2:5-dichloro-4-aminophenylpyridine, made as described below, are dissolved in 200 parts of toluene together with 9.5 parts of 2:3-hydroxynaphthoic acid and condensation effected at 60–65° C. with the aid of 3.2 parts of phosphorus trichloride which is added during 1 hour and the mixture then boiled for 15 hours. The product is isolated in the same way as the product of Example 1 and possesses similar properties thereto.

The isomeric 2:5-dichloroaminophenylpyridines are made by reacting diazotised 2:5-dichloroaniline with pyridine, mono nitrating and reducing the nitro product.

As many apparently widely different embodiments of this invention may be made without departing from the spirit and scope thereof, it is to be understood that the invention is not limited to the specific embodiments thereof except as defined in the appended claims.

We claim:

1. A compound represented by the formula

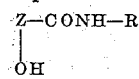

in which the hydroxy and N-substituted amide groups are in ortho positions to each other and wherein Z is one of a group consisting of the radicals of naphthalene, the 6-bromo and 6-methoxy derivatives thereof, carbazole, diphenylene oxide and anthracene, said radical having a free coupling position ortho to hydroxy; and R is from the group consisting of the radicals of C-phenyl pyridine, C-phenyl picolines and the methyl, methoxy, nitro and chloro aryl-substituted derivatives of said pyridines and picolines.

2. The pyridyl-anilides of 2-hydroxy-3-naphthoic acid.

3. The pyridyl-ortho-toluidides of 2-hydroxy-3-naphthoic acid.

4. The pyriydl-anilides of 2-hydroxy-carbazole-3-carboxylic acid.

5. The method of making 2-hydroxy-3-aroyl-4'-pyridyl- and picolyl-arylamides which comprises heating and refluxing a mixture of one of a group consisting of the 2-hydroxy-aryl-3-carboxylic acids of the naphthalene, carbazole, anthracene and diphenylene oxide series, and a non-aqueous solution of one of a group consisting of C-(amino-aryl)-pyridines and -picolines of the benzene series having one amino group in the benzene nucleus, said heating being continued with the addition of phosphorous-trichloride until an arylamide of the 2-hydroxy-aryl-3-carboxylic acid is formed, adding sodium carbonate and steam-distilling the toluene until a precipitate comprising said arylamide is formed, dissolving said arylamide in sodium hydroxide and separating insoluble material therefrom, and then precipitating said arylamide from said solution by adding acid.

ARNOLD KERSHAW.
KENNETH HERBERT SAUNDERS.

Certificate of Correction

Patent No. 2,265,432.  December 9, 1941.

ARNOLD KERSHAW ET AL.

It is hereby certified that errors appear in the printed specification of the above numbered patent requiring correction as follows: Page 1, first column, line 21, for "2s3" read *2:3*; and second column, line 21, for "4-amino" read *4-amino-α-phenylpyridine*; and that the said Letters Patent should be read with these corrections therein that the same may conform to the record of the case in the Patent Office.

Signed and sealed this 27th day of January, A. D. 1942.

[SEAL]

HENRY VAN ARSDALE,
*Acting Commissioner of Patents.*